Sept. 18, 1956     I. DENNIS     2,763,475
MEANS FOR FOAMING SYNTHETIC ELASTOMERS
Filed March 12, 1954
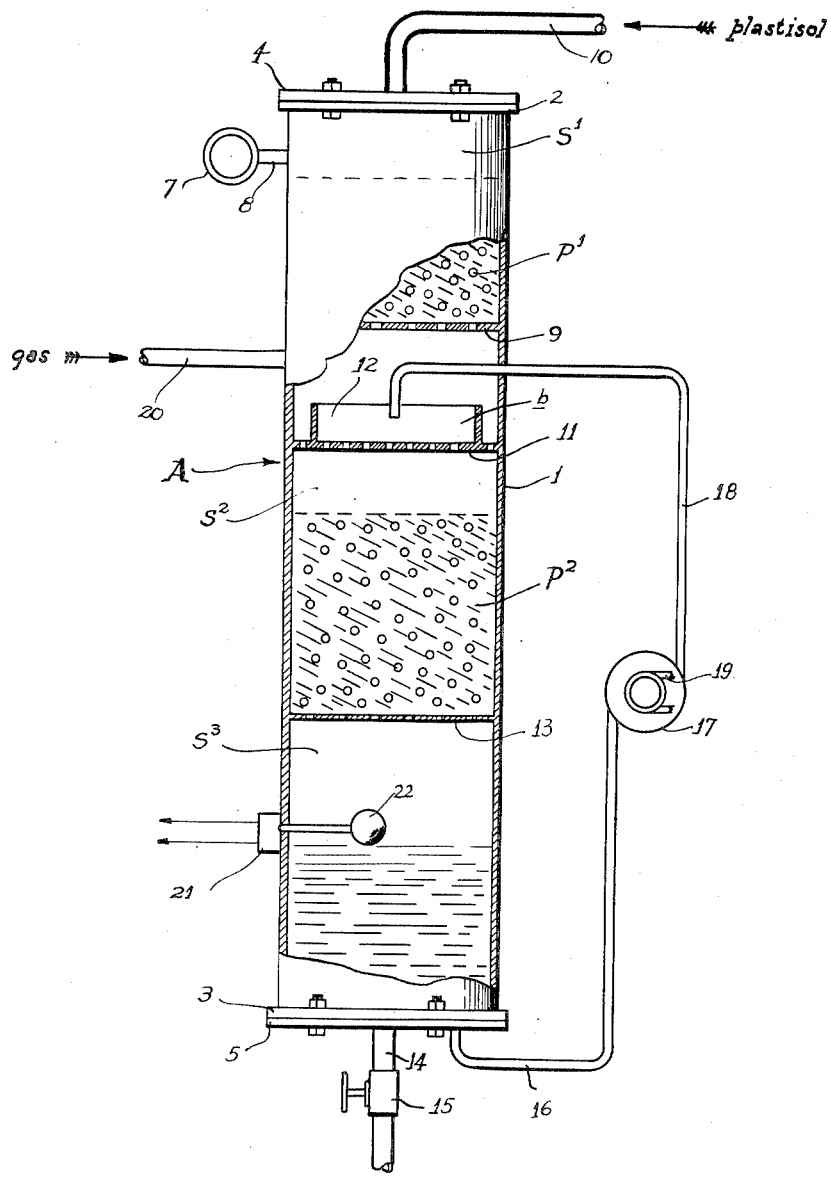
INVENTOR.
Israel Dennis
BY
Alfred W. Petchaft
Atty.

United States Patent Office 2,763,475
Patented Sept. 18, 1956

2,763,475

MEANS FOR FOAMING SYNTHETIC ELASTOMERS

Israel Dennis, University City, Mo.

Application March 12, 1954, Serial No. 415,775

3 Claims. (Cl. 261—36)

This invention relates in general to certain new and useful improvements in means for foaming synthetic elastomers and to the novel finished product resulting therefrom, and is a continuation-in-part of my co-pending application Serial No. 314,332, filed October 11, 1952.

It is the primary object of the present invention to provide unique means for continuously producing a sponge-like, resilient mass from a synthetic elastomer.

It is also an object of the present invention to provide apparatus, of the type and for the purposes stated, which achieves an extremely intimate mixture between a liquid elastomer and an inert gas under relatively moderate pressure, so that when the liquid-gas mixture is released, a very fine grained or small-pored product will result.

It is a further object of the present invention to provide simple, relatively inexpensive apparatus for producing foamed elastomers, which apparatus can be operated by any average workman without a high degree of specialized training or close supervision and which can be kept in continuous production over sustained periods without frequent repairs or overhauling.

With the above and other objects in view, my invention resides in the novel features of form, construction, arrangement, and combination of parts presently described and pointed out in the claims.

The accompanying drawing is a diagrammatic view of the novel apparatus for carrying out the present invention.

Broadly speaking, the present invention resides in the discovery that plastisols consisting essentially of vinyl resins, plasticizers, stabilizers, and pigments can be effectively impregnated with an inert gas, sub as carbon dioxide, at relatively low pressures and discharged, as a stable foam, into a suitable mold or cast into sheet form. The foamed plastisol can then be fused or cured by the application of heat. In formulating the liquid plastisols of the present invention, it has been found possible to use various types of vinyl resins, such as vinyl chloride polymer, vinyl chloride-acetate co-polymer, vinylidine chloride polymer, vinyl chloride-vinylidine chloride co-polymer; various types of plasticizers, such as phthalate esters of higher alcohols, such as di-octyl phthalate, phosphate esters, such as tri-cresyl phosphate or cresyl phenyl phosphate, hydrocarbons, such as panaflex BN-1, hydrogenated terphenyls, adipate esters, such as di-octyl adipate, polyesters, such as the paraplex G series; various types of stabilizers, such as barium ricinoleate, cadmium ricinoleate, dibutyl tin dilaurate, epoxy stabilizers, such as E6B; and various types of pigments, such as titanium dioxide, phthalocyanine blue. In connection with the latter materials, that is to say, pigments, it should be noted that the matter of pigmentation is entirely a question of the color desired and many other colors than phthalocyanine blue can be used, such color being cited merely as an illustrative example rather than as a limitation. After considerable research, it has been conclusively determined that the rate of gas absorption by vinyl resin plastisols is a hyperbolic function. In other words, at a selected condition of temperature, a vinyl resin plastisol, during the initial time period of exposure to an inert gas, such as carbon dioxide, will absorb quantities of the gas at a relatively rapid rate and this rate of absorption will decrease as saturation is approached. It has also been discovered that at relatively low pressures, that is to say, pressures under 100 p. s. i., the rate of inflection of the curve is much sharper and more pronounced than at high pressures. In the low pressure ranges, a vinyl resin plastisol will absorb gas very rapidly during the initial period of gas-liquid contact and then the curve will slope off and approach complete saturation at a relatively slow rate, so that in this upper portion the curve is relatively flat and the rate of change is not marked. On the other hand, in the high pressure ranges, the rate of absorption is even more rapid than the low pressure range, but the curve has an almost imperceptible point of inflection relatively close to complete saturation, so that the curve would be relatively steep and would approach a straight-line function for all practical purposes.

Upon superficial consideration, tthe type of gas absorption properties exhibited by plastisols at high pressure ranges may appear to be desirable as compared with the gas absorption characteristics at low pressure ranges. However, for commercial purposes in continuous processing it has been discovered that the reverse is true. Continuous operation necessitates continuous introduction of liquid plastisol into some suitable piece of liquid-gas contact equipment to which an inert gas is continuously supplied and from which the gas-charged liquid plastisol is continuously withdrawn. Obviously, it is impossible within the limits of commercially practicable equipment to avoid minor fluctuations in the rates of flow involved. However, the degree of foaming or "density" of the gas-charged liquid plastisol after it has been released and reaches physical equilibrium at atmospheric pressure is very sensitively affected by the gas content and it is, therefore, essential to hold variations in density within relatively close limits in order to provide a uniform commercial product. In continuous processing equipment, therefore, the low pressure range becomes uniquely desirable becouse it is possible to operate on the long, relatively flattopped portion of the curve where minor variations and fluctuations and variations in the length of time during which the liquid and gas are in contact will have relatively small effect upon the density of the discharged plastisol foam.

Irrespective of the theoretical considerations above outlined, which seem to represent a logical explanation of the results observed in connection with the present invention, it nevertheless has been experimentally established that foamed vinyl resin plastisols of practically uniform density can be produced on a continuous production basis with a minimum of scrap loss by using gassing pressures ranging from approximately 100 p. s. i. as an upper limit down to approximately 10 p. s. i as a lower limit. It has also been found that in operating at pressure ranges above the upper limits just named the problem of maintaining uniform density in continuous operation over substantial periods of time becomes highly critical and the percentage of scrap loss rises sharply to uneconomic proportions. Comparative commercial scale production runs at various gassing pressures within the 10–100 p. s. i. range as compared with substantially higher gassing pressures have clearly demonstrated the unique characteristics of the low pressure range.

Referring now specifically and in detail to the drawing which illustrates a practical embodiment of the present invention, A designates a gas-liquid absorption tower consisting of an elongated vertical cylinder or column 1, preferably of circular cross-sectional shape and provided at its upper and lower ends with flanges 2, 3, for gasketed engagement respectively with top and bottom closure end plates 4, 5, held in place by flange bolts. The column 1 is preferably provided adjacent its upper end with a conventional pressure gauge 7 which communicates to the interior of the tower A through a short pipe connection 8.

Adjacent its upper end the tower is provided with a horizontally extending perforated plate 9 for supporting a relatively thick compact layer of packing P¹ consisting preferably of small sized Raschig rings or other similar broken bits of vitreous material, glass beads, or the like. The layer of packing extends upwardly and terminates approximately in the plane indicated by the dotted line in Figure 1, allowing a reasonable amount of free space S¹ at the top of the tower A to permit even distribution and downward flow of the plastisol. Conventionally mounted in the top closure plate 4 of the tower A and opening downwardly into the space S¹ is a liquid intake line 10 for introduction of plastisol into the tower A either in the manner specifically disclosed in the above-mentioned co-pending application or in any other suitable manner.

The column 1 is also internally provided with a second perforated plate 11 disposed in downwardly spaced parallel relation to the plate 9 and having an upstanding annular flange or collar 12 forming a distribution basin b. Similarly, the tower A is internally provided with a third perforated plate 13 located in downwardly spaced relation to the plate 11 for supporting a second bed of packing P² of substantially the same type and character as the previously described body of packing P¹ and terminating at its upper level in downwardly spaced relation to the plate 11 to provide a free space S², as best seen in Figure 1.

The plate 13 is, furthermore, located substantially above the bottom closure plate 5 in the provision of a space or chamber S³ in which the gas-charged plastisol can accumulate. The bottom plate 5 of the tower A is centrally provided with a discharge pipe 14 having a conventional control valve 15 to provide controlled withdrawal of gas-charged plastisol. The bottom plate 5 is also provided with a somewhat smaller discharge line 16 which is connected at its external end to a recirculation pump 17, the latter being in turn connected on its discharge side to a recirculation line 18 which extends into the tower A and discharges into the distribution basin b for providing substantially uniform distribution and intermixture between the recirculated liquid and the fresh liquid flowing downwardly from the bed of packing P¹. The pump 17 is conventionally driven by means of the belt 19 from any suitable type of prime mover (not shown) and in this connection it should be pointed out that the pump 17 is shown schematically but it is intended to represent a positive-displacement type of pump such as a piston pump or diaphragm pump. Because of the heat sensitivity of liquid plastisols, any pump which generates an appreciable amount of frictional heat, such as a gear pump or centrifugal pump, should be avoided.

Opening into the tower A directly beneath the plate 9 is a gas intake line 20 which is conventionally connected to a high pressure supply of inert gas, such as carbon dioxide. It should be understood in this connection that the gas supply line should be provided with a valve, pressure gauge and pressure regulator, all of which are conventional and, therefore, are not shown. The tower A is finally provided with a liquid level control 21 having a conventional sensory element 22 located at a predetermined height within the lower portion of the tower A. The liquid level control 21 is connected electrically to controls associated with the liquid plastisol intake supply in substantially the manner shown and described in the aforementioned co-pending application.

In use the tower A is filled with inert gas, such as carbon dioxide, and the pressure therein brought up to any selected pressure within the heretofore specified pressure range, that is to say, 10–100 p. s. i. Thereupon a liquid plastisol formulation from the above-specified materials is pumped in through the liquid intake line 10 and permitted to flow smoothly and freely down through the body of packing P¹ and through the plate 9 into the distribution basin b. The liquid plastisol will flow thence downwardly through the perforated plate 11, through space S², into and through the body of packing P² and through the plate 13 to accumulate quiescently in the bottom of the tower A until the level reaches the limit established by the level control 21, whereupon the supply of incoming liquid will be automatically shut off. As soon as a sufficient quantity of liquid accumulates in the bottom of the tower A the recirculation pump 17 may be started up and the gas-charged liquid plastisol recirculated to the distribution basin b. The recirculation of the gas-charged liquid plastisol will, of course, tend to reduce the level accumulated within the bottom of the tower A and the level control 21 will correspondingly initiate further input of liquid plastisol through the line 10 until the system has been charged with sufficient liquid to maintain the desired level in the bottom of the tower A. Thereafter the liquid level control 21 will function to control the input of liquid plastisol through the intake line 10 in direct proportion to the amount withdrawn through the valve 15.

When the valve 15 is opened the gas-charged liquid plastisol will discharge therefrom and immediately form a light, small-pored foam having a creamy texture. It will, of course, be understood that the foam may be pigmented to possess any desired color. The foam may be formed into sheets, blocks, or introduced into molds and cured or solidified by application of heat. The curing procedure can be most efficiently carried out by passing the foam through an oven under precisely controlled temperature conditions to form a stable, resilient spongy elastomer.

It should be understood that changes and modifications in the form, construction, arrangement, and combination of the several parts of the apparatus for foaming synthetic elastomers may be made and substituted for those herein shown and described without departing from the nature and principle of my invention.

Having thus described my invention, what I claim and desire to secure by Letters Patent is:

1. Apparatus for producing synthetic resin plastisol foam which comprises a vertical tower entirely enclosed at all times during operation having upper and lower separate bodies of pervious packing extending across the entire horizontal area of the tower and having a relatively large surface area for establishing liquid-gas contact, an inlet pipe having an opening into the upper end of the tower for introducing liquid plastisol thereinto, said tower further having a free space between said bodies and having free spaces above and below the uppermost and lowermost of said bodies respectively, means for conducting a portion of the gas-charged plastisol from the bottom of said tower upwardly and discharging it between the upper and lower bodies for downward movement through the lower body without at any time reducing substantially the pressure of the plastisol, means for supplying and maintaining gas under pressure to said tower in such a manner as to permit no exit flow of unabsorbed gas, and means for withdrawing gas-charged plastisol under the force generated by the pressure within the tower.

2. Apparatus for producing synthetic resin plastisol foam which comprises a vertical tower entirely enclosed at all times during operation having two separate bodies of pervious material extending across the entire horizontal area of the tower for establishing liquid-gas contact, an inlet pipe having an opening into the upper end of the tower for introducing liquid plastisol thereinto, said tower further having a free space between said bodies and having free spaces above and below the uppermost and the lowermost of said bodies respectively, a distributor plate in the free space between said bodies, means for introducing gas under pressure into said tower, means for recirculating a portion of the gas-charged liquid from the bottom of the tower to the upper surface of the distributor plate without substantially reducing its pressure, and means for withdrawing gas-charged plastisol from the bottom of said tower under the force generated by the pressure within the tower.

3. Apparatus for producing synthetic resin plastisol foam which comprises a vertical tower entirely enclosed at all times during operation, two separate bodies of pervious packing extending across the entire horizontal area of the tower and having a relatively large surface area for establishing liquid-gas contact, an inlet pipe having an opening into the upper end of the tower for introducing liquid plastisol thereinto, said tower further having a free space between said bodies and having free spaces above and below the uppermost and the lowermost of said bodies respectively, means for maintaining in said tower a supply of gas under pressure in such a manner as to permit no exit-flow of unabsorbed gas, a foraminous distributor plate disposed in spaced relation to said contact bodies in the free space between said bodies of pervious packing, means for recirculating a portion of the gas-charged liquid from the bottom of the tower to the upper surface of the distributor plate without substantially reducing its pressure, and means for withdrawing gas-charged plastisol from the bottom of said tower under the force generated by the pressure within the tower.

References Cited in the file of this patent

UNITED STATES PATENTS

| | | |
|---|---|---|
| 758,403 | Youngblood | Apr. 26, 1904 |
| 860,753 | Lloyd | July 23, 1907 |
| 1,798,563 | Styrud | Mar. 31, 1931 |
| 1,809,646 | Sperr | June 9, 1931 |
| 2,536,340 | Alikonis | Jan. 2, 1951 |
| 2,666,036 | Schwenke | Jan. 12, 1954 |

FOREIGN PATENTS

| | | |
|---|---|---|
| 90,327 | Germany | Feb. 2, 1897 |
| 647,625 | Germany | July 9, 1937 |
| 665,607 | Germany | Sept. 30, 1938 |